(12) United States Patent
Bharat et al.

(10) Patent No.: US 8,321,410 B1
(45) Date of Patent: *Nov. 27, 2012

(54) IDENTIFICATION OF SEMANTIC UNITS FROM WITHIN A SEARCH QUERY

(75) Inventors: Krishna Bharat, Santa Clara, CA (US); Sanjay Ghemawat, Mountain View, CA (US); Urs Hoelzle, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 11/764,566

(22) Filed: Jun. 18, 2007

Related U.S. Application Data

(63) Continuation of application No. 09/729,240, filed on Dec. 5, 2000, now Pat. No. 7,249,121.

(60) Provisional application No. 60/237,389, filed on Oct. 4, 2000.

(51) Int. Cl.
*G06F 17/30* (2006.01)

(52) U.S. Cl. ........ 707/728; 707/706; 707/713; 707/730; 707/750

(58) Field of Classification Search .................. 707/1, 3, 707/5, 7, 100, 57, 706, 713, 723, 728, 730, 707/750; 709/225
See application file for complete search history.

(56) References Cited

U.S. PATENT DOCUMENTS

| | | | | |
|---|---|---|---|---|
| 5,278,980 | A * | 1/1994 | Pedersen et al. | 707/4 |
| 5,544,049 | A | 8/1996 | Henderson et al. | |
| 5,778,361 | A | 7/1998 | Nanjo et al. | |
| 6,012,053 | A | 1/2000 | Pant et al. | |
| 6,078,914 | A * | 6/2000 | Redfern | 1/1 |
| 6,088,692 | A | 7/2000 | Driscoll | |
| 6,134,554 | A | 10/2000 | Freimann et al. | |
| 6,216,123 | B1 * | 4/2001 | Robertson et al. | 707/999.001 |
| 6,236,768 | B1 | 5/2001 | Rhodes et al. | |
| 6,289,353 | B1 | 9/2001 | Hzalehurst et al. | |
| 6,295,529 | B1 * | 9/2001 | Corston-Oliver et al. | 707/715 |
| 6,295,559 | B1 | 9/2001 | Emens et al. | |
| 6,317,718 | B1 | 11/2001 | Fano | |
| 6,321,226 | B1 * | 11/2001 | Garber et al. | 707/10 |
| 6,385,602 | B1 | 5/2002 | Tso et al. | |
| 6,493,744 | B1 | 12/2002 | Emens et al. | |
| 6,510,406 | B1 * | 1/2003 | Marchisio | 704/9 |
| 6,513,031 | B1 | 1/2003 | Fries et al. | |
| 6,549,897 | B1 * | 4/2003 | Katariya et al. | 707/5 |
| 6,678,677 | B2 * | 1/2004 | Roux et al. | 707/999.003 |
| 6,772,150 | B1 * | 8/2004 | Whitman et al. | 1/1 |
| 6,850,935 | B1 * | 2/2005 | Ponte | 707/6 |
| 7,366,711 | B1 * | 4/2008 | McKeown et al. | 707/3 |

OTHER PUBLICATIONS

"The PageRank Citation Ranking: Bringing Order to the Web"; Jan. 28, 1998; pp. 1-17.
"The Anatomy of a large-Scale Hypertextual Web Search Engine"; Sergey Brin et al.; print date Aug. 7, 2000; pp. 1-20.
Krishna Bharat et al.; "Identification of Semantic Units from Within a Search Query"; U.S. Appl. No. 09/729,240, filed Dec. 5, 2000; 30 pages.

\* cited by examiner

*Primary Examiner* — Dangelino Gortayo
(74) *Attorney, Agent, or Firm* — Harrity & Harrity, LLP

(57) ABSTRACT

A search engine for searching a corpus improves the relevancy of the results by classifying multiple terms in a search query as a single semantic unit. A semantic unit locator of the search engine generates a subset of documents that are generally relevant to the query based on the individual terms within the query. Combinations of search terms that define potential semantic units from the query are then evaluated against the subset of documents to determine which combinations of search terms should be classified as a semantic unit. The resultant semantic units are used to refine the results of the search.

12 Claims, 3 Drawing Sheets

IDENTIFICATION OF SEMANTIC UNITS FROM WITHIN A SEARCH QUERY

RELATED APPLICATIONS

This application is a continuation of U.S. patent application Ser. No. 09/729,240, filed Dec. 5, 2000, which claims priority under 35 U.S.C. §119(e) based on U.S. Provisional Application Ser. No. 60/237,389, filed Oct. 4, 2000, the disclosures of which are hereby incorporated herein by reference.

BACKGROUND OF THE INVENTION

A. Field of the Invention

The present invention relates generally to information location and, more particularly, to search engines that locate information on the World Wide Web.

B. Description of Related Art

The World Wide Web ("web") contains a vast amount of information. Locating a desired portion of the information, however, can be challenging. This problem is compounded because the amount of information on the web and the number of new users inexperienced at web research are growing rapidly.

People generally surf the web based on its link graph structure, often starting with high quality human-maintained indices or search engines. Human-maintained lists cover popular topics effectively but are subjective, expensive to build and maintain, slow to improve, and do not cover all esoteric topics.

Automated search engines, in contrast, locate web sites by matching search terms entered by the user to a pre-indexed corpus of web pages. Generally, the search engine returns a list of web sites sorted based on relevance to the user's search terms. Determining the correct relevance, or importance, of a web page to a user, however, can be a difficult task. For one thing, the importance of a web page to the user is inherently subjective and depends on the user's interests, knowledge, and attitudes. There is, however, much that can be determined objectively about the relative importance of a web page. Conventional methods of determining relevance are based on matching a user's search terms to terms indexed from web pages. More advanced techniques determine the importance of a web page based on more than the content of the web page. For example, one known method, described in the article entitled "The Anatomy of a Large-Scale Hypertextual Search Engine," by Sergey Brin and Lawrence Page, assigns a degree of importance to a web page based on the link structure of the web page.

Multiple search terms entered by a user are often more useful if considered by the search engine as a single compound unit. Assume that a user enters the search terms "baldur's gate download." The user intends for this query to return web pages that are relevant to the user's intention of downloading the computer game called "baldur's gate." Although "baldur's gate" includes two words, the two words together form a single semantically meaningful unit. If the search engine is able to recognize "baldur's gate" as a single semantic unit, called a compound herein, the search engine is more likely to return the web pages desired by the user.

For example, one application for compound units in a search engine might be to modify the ranking component of the search engine, so that documents containing the compound are considered more relevant than documents that contain the individual words but not the compound.

Another application may be to suggest alternate queries that either extends, shortens, or replaces words in the current query in minor ways based on prior queries logged by the system. To be useful, such an application should suggest semantically meaningful alternatives. In the above "baldur's gate" example, a semantically meaningful alternative may be "baldur's gate reviews" (i.e., written reviews of the game).

Conventionally, the identification of compounds in queries has focused on identifying compounds based on a list of previously identified compounds and statistics describing the relative frequency of occurrence of the compounds. Two approaches have commonly been used to construct such a list of compounds.

The first approach involves extracting the compound from the corpus of documents. In this approach, the documents are processed and word sequences that occur with a frequency that is statistically significant are identified as compounds. The disadvantage with this approach is that it is inefficient, because there are many more compounds in the corpus than would typically occur in user queries. Thus, only a small fraction of the detected compounds are useful in practice. This is particularly true in a highly multi-lingual and diverse corpus such as the web. Identifying all compounds on the web is computationally difficult and would require considerable amounts of storage. Additionally, determining when a compound is statistically significant can be problematic. Many compounds of interest, e.g., names, may occur relatively infrequently, thus making it hard to accumulate a statistically significant sample.

The second approach involves extracting compounds from a query log. This technique is similar to the above-discussed first approach, except that compounds are extracted from a log of past user queries instead of from the corpus of web documents. A disadvantage associated with finding compounds in query logs using statistical techniques is that word sequences occurring in query logs may not correspond to compounds in the documents. This is because queries, especially on the web, tend to be abbreviated forms of natural language sequences. For example, the words "mp3" and "download" may occur together often in query logs but "mp3 download" may not occur as a compound in a document.

A disadvantage of both corpus and query log based techniques, and indeed of any technique relying purely on previously detected compounds and on statistics to segment a query, is that they tend to ignore the meaning of the query. Such techniques may identify a compound that is not consistent with the meaning of the query, which can negatively impact applications that rely on the compound as being a semantic unit within the query.

For example, the queries "country western mp3" and "leaving the old country western migration" both have the words "country" and "western" next to each other. Only for the first query, however, is "country western" a representative compound. Segmenting such queries correctly requires some understanding of the meaning of the query. In the second query, the compound "western migration" is more appropriate, although it occurs less frequently in general.

Thus, there is a need in the art to be able to more accurately identify compounds that correspond to a semantically meaningful unit.

SUMMARY OF THE INVENTION

Systems and methods consistent with the present invention address this and other needs by identifying compounds based on the overall context of a user query.

One aspect of the present invention is directed to a method of identifying semantic units within a search query. The method includes identifying documents relating to the query by matching individual search terms in the query to an index of a corpus and generating substrings of the query. For each of the generated substrings, a value is calculated that relates to the portion of the identified documents that contains the substring. Semantic units are selected from the generated substrings based on the calculated values.

A second aspect of the present invention is directed to a method of locating documents in response to a search query. The method includes generating a list of relevant documents based on individual search terms of the query and identifying a subset of documents that are the most relevant documents from the list of relevant documents. Substrings are identified for the query and a value related to the portion of the subset of documents that contains the substring is generated. Semantic units are selected from the generated substrings based on the calculated values. Finally, the list of relevant documents is refined based on the semantic units.

A third aspect of the present invention is directed to a server that includes a processor, a database, and a memory. The memory includes a ranking component configured to return a list of documents ordered by relevance in response to a search query and a semantic unit locator component that locates semantic units in search queries entered by a user based on a predetermined number of the most relevant documents in the list returned by the ranking component.

Additional aspects of the present invention are directed to computer systems and to computer-readable media having features relating to the first three aspects.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention. Instead, the scope of the invention is defined by the appended claims and equivalents.

As described herein, a semantic unit locator identifies compounds within a query based on the overall context of the query. The semantic unit locator generates a subset of documents that are generally relevant to the query based on the individual terms within the query. Combinations of potential compounds from the query are then evaluated against the subset of documents.

Figure 1:
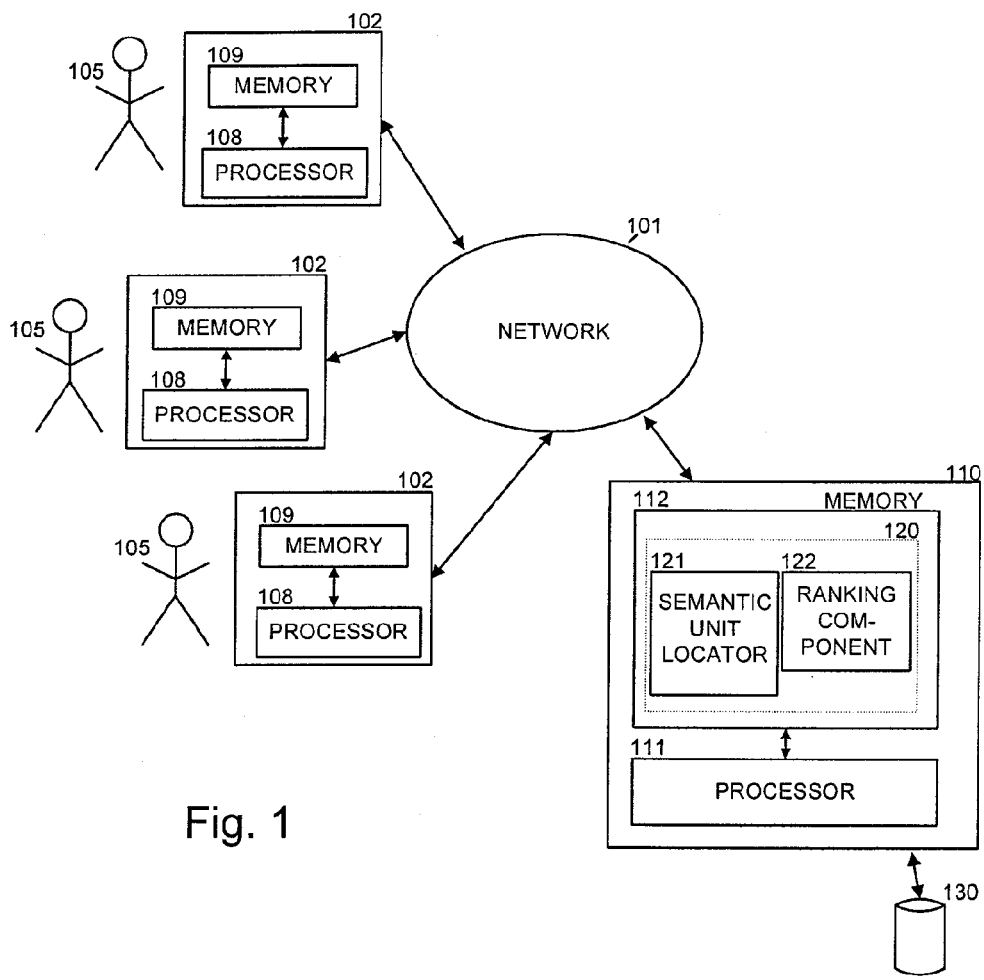
FIG. 1 is a diagram illustrating an exemplary network in which concepts consistent with the present invention may be implemented.

FIG. 1 is a diagram illustrating an exemplary network in which concepts consistent with the present invention may be implemented. The computer network includes multiple client devices 102, a server device 110, and a network 101, which may be, for example, the Internet. Client devices 102 each include a computer-readable medium 109, such as random access memory, coupled to a processor 108. Processor 108 executes program instructions stored in memory 109. Client devices 102 may also include a number of additional external or internal devices, such as, without limitation, a mouse, a CD-ROM, a keyboard, and a display.

Through client devices 102, users 105 can communicate over network 101 with each other and with other systems and devices coupled to network 101, such as server device 110.

Similar to client devices 102, server device 110 may include a processor 111 coupled to a computer readable memory 112. Server device 110 may additionally include a secondary storage element, such as database 130.

Client processors 108 and server processor 111 can be any of a number of well known computer processors, such as processors from Intel Corporation, of Santa Clara, Calif. In general, client device 102 may be any type of computing platform connected to a network and that interacts with application programs, such as a digital assistant or a "smart" cellular telephone or pager. Server 110, although depicted as a single computer system, may be implemented as a network of computer processors.

Memory 112 may contain a search engine program 120. Search engine 120 may include a semantic unit locator 121 and a ranking component 122. A more detailed description of the functionality implemented by search engine 120, semantic unit locator 121, and ranking component 122 will be described below. Search engine program 120 locates relevant information in response to search queries from users 105. In particular, users 105 send search queries to server device 110, which responds by returning a list of relevant information to the user 105. Typically, users 105 ask server device 110 to locate web pages relating to a particular topic and stored at other devices or systems connected to network 101. Semantic unit locator 121 assists search engine 120 in locating relevant information by identifying compounds in the user search queries.

The operation of semantic unit locator 121 will now be described in more detail with reference to the flow charts of FIGS. 2 and 3. In general, semantic unit locator 121 operates by looking at relevant documents for a particular query and identifying compounds within the relevant documents that also occur in the query.

To begin, search engine 120 receives a query from a user 105. (Act 201). As an exemplary query, assume the user 105 inputs "leaving the old country western migration." Ranking component 122 generates a list of relevant documents, ordered by relevance, based on the user query. (Act 202). "Relevance" in this context may be defined based on factors including but not limited to the proximity between query words in the returned documents (e.g., documents in which the query words are close to each other are considered more relevant) and the order of the words in the returned document (e.g., documents in which the query words are in the same order as in the query phrase are considered more relevant). The returned list of documents may be extracted from a pre-indexed corpus of web documents, which may be stored in database 130. In general, processes for indexing web documents and searching the indexed corpus of web documents to return relevant documents is well known in the art. Accordingly, the functionality of ranking component 122 will not be described further herein.

The ranked list of documents returned by ranking component 122 may be very long. Semantic unit locator 121 may use only a subset of the returned documents. (Act 203). More particularly, semantic unit locator 121 may operate on the k most relevant documents returned by ranking component 122, where k is a predetermined number, such as 30.

The user's query may contain a number of different multi-word substrings that could potentially be a compound. The input query "leaving the old country western migration," for example, includes a number of different multi-word substrings, such as: "leaving the," "leaving the old," "leaving the old country," "leaving the old country western," "leaving the old country western migration," "the old," "the old country," "the old country western," "the old country western migration," "old country," "old country western," etc.

Semantic unit locator 121 may generate a first substring, s, of the user's query (e.g., "leaving the"). (Act 204). The semantic locator may then generate a value representing the fraction of the documents in the subset of returned documents that contain the substring. (Act 205). Thus, if 15 documents in a 30 document subset contained the substring "leaving the," then the value generated would be ½. This process is repeated for each substring in the query. (Acts 206 and 207). The complete set of values generated by semantic unit locator 121 define a function, referred to herein as the function FRAC[s], which, for any substring s, returns the fraction of the k documents containing s.

Based on FRAC[s], semantic unit locator 121 selects substrings that occur frequently in the set of k documents. More particularly, semantic unit locator 121 selects the substrings that have FRAC[s] greater than a predetermined threshold, f (e.g., f=0.25). (Act 208). Substrings that are completely contained within a longer substring that has FRAC(s)>f are not selected. If two or more of the selected substrings overlap, semantic unit locator 121 selects the substring with the higher FRAC value. (Act 209). The resultant set of compounds defines the segmentation of the initial query.

As an example of Acts 208 and 209, assume that the query "leaving the old country western migration" has four substrings having FRAC[s] greater than f, namely: "the old country" (f=0.53), "old country" (f=0.55), "western migration" (f=0.5), and "country western" (f=0.4). In Act 208, semantic unit locator 121 discards "old country," as it is completely contained in the longer substring "the old country," which has a FRAC value greater than the threshold. In Act 209, "country western" is discarded as it overlaps with "the old country" and "western migration" and has the lowest FRAC value of these three terms. Thus, in this example, the processed query contains the compounds "the old country" and "western migration," along with the single search term "leaving." Although the example described above included consideration of the word "the," other implementations may exclude the consideration of commonly-occurring words.

Figure 2:
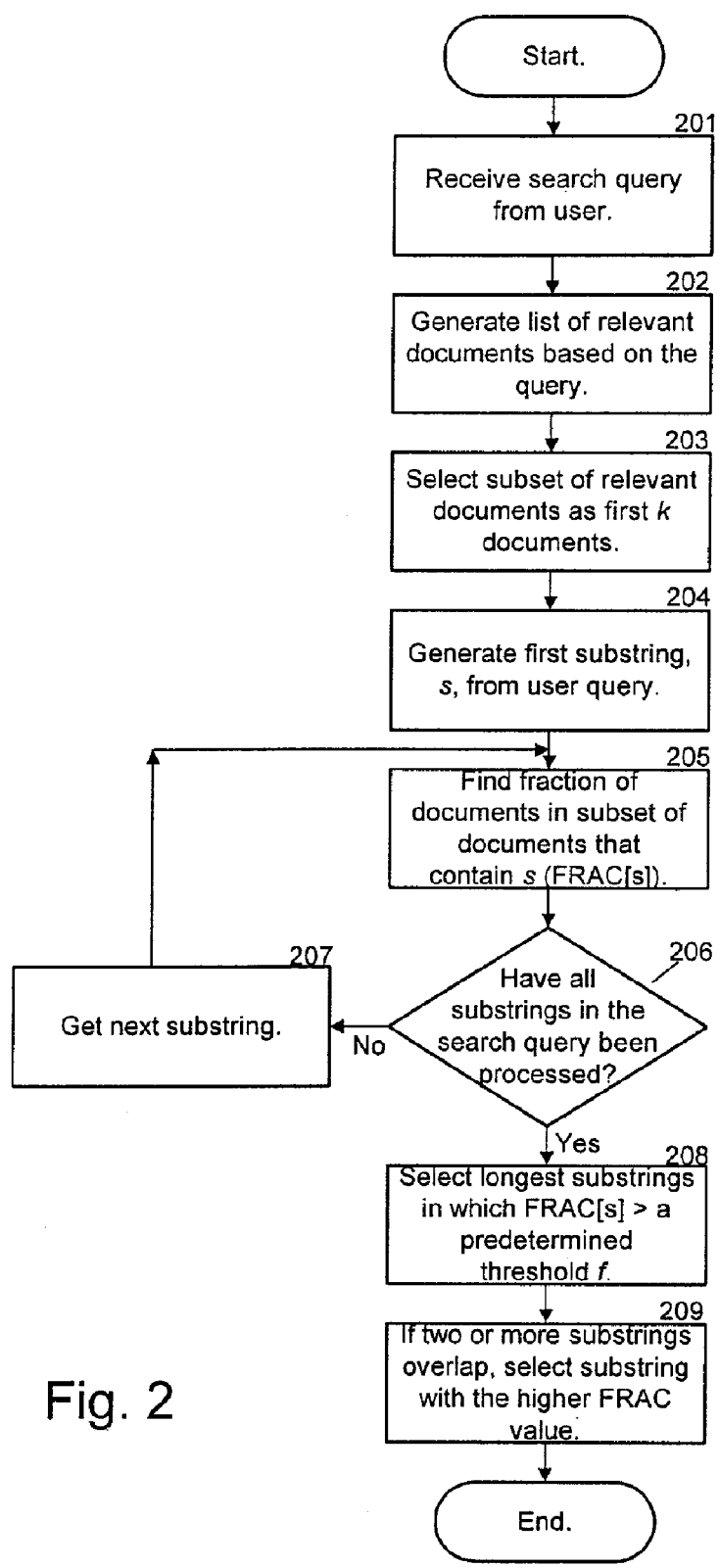
FIG. 2 is a flow chart illustrating methods for locating semantic units within a search query.

As an alternative implementation for finding compounds to that discussed in FIG. 2, semantic unit locator 121 may give additional preference to highly ranked documents in the k subset of documents. In other words, a substring that is in, for example, the most highly ranked document of the k documents, is counted more heavily than if the substring was in a lower ranking one of the k documents. One method for accomplishing this is to compute FRAC[s] as a weighted sum based on the ranking of the document in which the compound s occurs. FIG. 3 is a flow chart illustrating, in more detail, this method for calculating FRAC[s].

Figure 3:
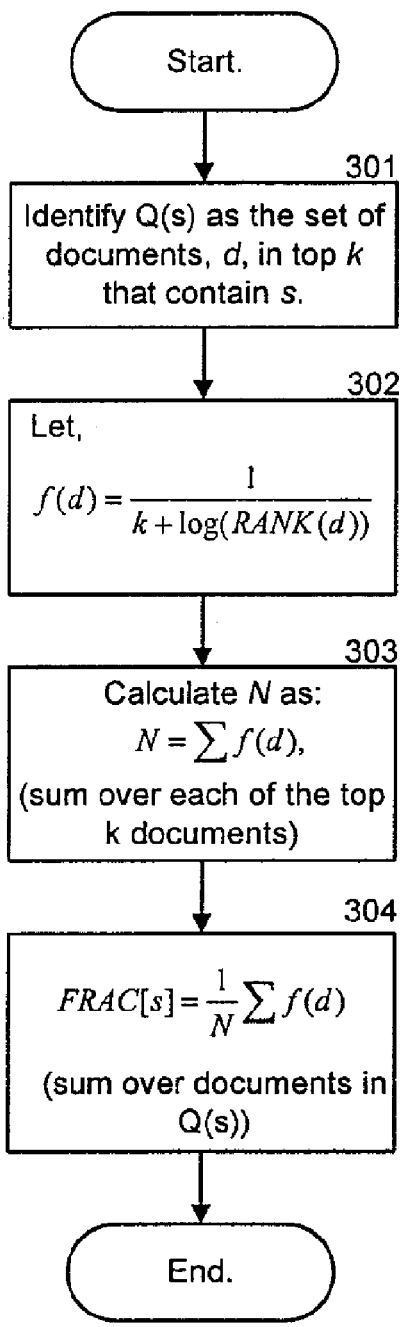
FIG. 3. is a flow chart illustrating a method for calculating a weighted fraction of documents within a subset of documents.

In relation to the method of FIG. 2, Acts 301-304, illustrated in FIG. 3, may be used as an alternative to calculating FRAC[s] (as calculated in Acts 205-207 of FIG. 2).

Semantic unit locator 121 identifies a set of documents, Q(s), as the documents in the most relevant k documents that contain the substring s (i.e., the first k documents returned from ranking component 122). (Act 301). A function, f(d), is defined as:

$$f(d) = \frac{1}{k + \log(\text{RANK}(d))},$$

where RANK(d) returns the ranking (one through k) of document d. (Act 302). Semantic unit locator 121 calculates N as:

$$N = \Sigma f(d),$$

where the sum is over all of the k documents. Finally, FRAC[s] is defined as:

$$FRAC[s] = \frac{1}{N} \sum f(d),$$

where the sum is over all documents d in Q(s). (Act 304).

FRAC[s], once defined with the method in Acts 301-304, can be applied by semantic unit locator 121 in the manner described above with regards to Acts 208 and 209 In summary, semantic unit locator 121 intelligently identifies compounds within a query by first identifying documents related to the individual terms in the query. Compounds are then selected using a methodology based on the rate of occurrence of the compound within the identified documents. The methodology illustrated in Acts 205-207 of FIG. 2 identifies compounds based on the fraction of each compound occurring in the identified documents. In the methodology of FIG. 3, compounds are identified based on a weighted fraction of each compound occurring in the identified documents, where the weighting factor is derived from the relevance of the identified documents.

Compounds identified by semantic unit locator 121 may be used in search engine 120 in a number of different ways.

The semantic unit locator 121 may receive the search query input by a user in real-time. Semantic unit locator 121 may then identify compounds and use the compounds to refine the ranking of the list of relevant documents initially located by the search engine 120.

Alternatively, instead of immediately having semantic unit locator 121 find compounds in an input query, search engine 120 may save input queries to a log. In a subsequent, potentially off-line step, semantic unit locator may identify and save compounds for the logged queries. When the same query or a closely related query is then received by search engine 120, the saved compounds are used by search engine 120.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the preceding description generally discussed the operation of search engine 120 in the context of a search of documents on the world wide web, search engine 120, and hence semantic unit locator 121, could be implemented on any corpus.

The scope of the invention is defined by the claims and their equivalents.

What is claimed:
1. A method performed by a server device, the method comprising:
receiving, by the server device, information identifying documents selected in response to a search query;
generating, by a processor of the server device, a plurality of substrings from the received search query, each of the plurality of substrings including at least two words;

detecting, by the processor of the server device, an actual occurrence of one or more substrings, of the plurality of substrings, in one or more of the documents;

calculating, by the processor of the server device, for each of the one or more substrings generated from the search query, a value that indicates a fraction of the documents in which an actual occurrence of the substring is detected;

determining, by the processor of the server device, based on the calculated value for a particular substring of the one or more substrings, that the particular substring consists of words that form a single compound unit, the determining including:

determining that the calculated value exceeds a threshold associated with compound units of words; and identifying, by the processor of the server device, a set of relevant documents based on determining that the particular substring forms the single compound unit.

2. The method of claim 1, further comprising:

discarding substrings, of the plurality of substrings, that overlap other ones of substrings, of the plurality of substrings, with higher calculated values.

3. The method of claim 1, where the calculated values are based on a ranking defined by relevance of the documents to the search query, where substrings, of the plurality of substrings, that occur in more relevant ones of the documents are assigned higher calculated values than other substrings, of the plurality of substrings, that occur in less relevant ones of the documents.

4. A system comprising:

a server connected to a network, the server to receive a search query from a user device via the network, the server including:

at least one processor; and a memory operatively coupled to the at least one processor, the memory storing program instructions that when executed by the at least one processor, cause the at least one processor to:

identify documents relating to the received search query by comparing search terms in the received search query to an index of a corpus of documents;

generate a plurality of substrings from the received search query, each substring, of the plurality of substrings, including at least two words of the received search query;

detect an actual occurrence of a particular substring, of the plurality of substrings, in the identified documents;

calculate a value that indicates a fraction of the identified documents in which an actual occurrence of the particular substring was detected;

determine, based on the calculated value, that the particular substring consists of words that, when taken together, form a single compound unit, the at least one processor, when determining that the particular substring consists of words that, when taken together, form a single compound unit, is to:

determine that the calculated value exceeds a threshold value associated with substring consisting of words that, when taken together, form a single compound unit; and identify a set of relevant documents based on determining that the particular substring consists of words that form the single compound unit.

5. The system of claim 4, where the program instructions further cause the at least one processor to:

refine a list, that includes the identified documents, based on the particular substring when the particular substring consists of words that form the single compound unit.

6. The system of claim 4, where the program instructions further cause the at least one processor to:

generate a refined list of the identified documents based on the identified documents and the particular substring that forms the single compound unit.

7. The system of claim 4, where the network is the Internet and the corpus is a collection of web documents.

8. The system of claim 4, where the calculated value is based on a ranking defined by relevance of the identified documents, where ones of the plurality of substrings that occur in more relevant ones of the identified documents are assigned higher calculated values than other ones of the plurality of substrings that occur in less relevant ones of the identified documents.

9. A computer-readable medium, comprising:

a plurality of computer-executable instructions, which, when executed by one or more processors, cause the one or more processors to:

receive a search query;

receive information identifying documents selected in response to the search query;

generate a plurality of substrings from the search query, each of the substrings including at least two words;

detect, for one or more substrings, of the plurality of substrings generated from the search query, one or more actual occurrences of the one or more substrings in the identified documents;

calculate, for each of the one or more substrings generated from the search query, a value that indicates a fraction of the documents in which an actual occurrence of the each substring is detected;

determine, based on the calculated values, that at least one of the one or more substrings consists of words that, when taken together, form a single compound unit, the computer-executable instructions that cause the one or more processors to determine which of the one or more substrings consist of words that, when taken together, form a single compound unit, including computer-executable instructions that cause the one or more processors to:

determine which calculated values, of the calculated values, exceed a threshold value associated with substrings consisting of words that, when taken together, form respective single compound units; and identify a set of relevant documents based on determining that the at least one of the one or more substrings form the single compound unit.

10. The computer-readable medium of claim 9, where the search query includes a set of words, where a particular substring, of the plurality of substrings, includes only words included in the search query.

11. A server device, comprising:

a memory device storing computer-executable instructions; and one or more processors to execute the computer-executable instructions, to:

generate a list of relevant documents based on individual search terms of a search query;

identify a subset of documents that are most relevant documents, to the search query, from the list of relevant documents;

form a plurality of multiword substrings of the search query, each of the plurality of multiword substrings including at least two words;

detect, for each of the plurality of multiword substrings, actual occurrences of the multiword substring in the subset of documents;

calculate, for each of the plurality of multiword substrings generated from the search query, a value that indicates a fraction of the relevant documents in which an actual occurrence of the each substring is detected;

identify, based on the detected actual occurrences of each of the plurality of multiword substrings, that words of at least one of the plurality of multiword substrings, when taken together, form a single compound unit, when identifying that words of at least one of the multiword substrings, when taken together, form a single compound unit, the one or more processors are to:

determine that the calculated value associated with the at least one of the plurality of multiword substrings exceeds a threshold value associated with compound units; and identify a set of documents, the set of documents being identified based on the identified at least one of the plurality of multiword substrings.

12. The server device of claim 11, where the one or more processors are further to:

refine the set of documents based on the identified at least one of the plurality of multiword substrings, where when identifying the set of documents, the one or more processors are to identify the set of documents based on the refining.

* * * * *